United States Patent
Burkhard

(10) Patent No.: US 7,339,122 B2
(45) Date of Patent: Mar. 4, 2008

(54) WEIGHING MODULE HAVING PORTIONS ARRANGED WITHIN THE DESIGN SPACE OF ANOTHER WEIGHING MODULE

(75) Inventor: Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 41 days.

(21) Appl. No.: 11/372,211

(22) Filed: Mar. 10, 2006

(65) Prior Publication Data

US 2006/0201719 A1    Sep. 14, 2006

(30) Foreign Application Priority Data

Mar. 10, 2005   (EP) .................. 05101845

(51) Int. Cl.
G01G 9/00    (2006.01)
G01G 21/00    (2006.01)

(52) U.S. Cl. .................. 177/1; 177/210 EM; 177/212; 177/229

(58) Field of Classification Search .................. 177/1, 177/210 EM, 212, 229
See application file for complete search history.

(56) References Cited

U.S. PATENT DOCUMENTS

| | | | |
|---|---|---|---|
| 4,497,386 A | * | 2/1985 | Meier .................. 177/229 |
| 5,090,494 A | * | 2/1992 | Muller et al. .................. 177/229 |
| 5,183,125 A | * | 2/1993 | Schurr .................. 177/211 |
| 6,563,060 B2 | * | 5/2003 | Komoto .................. 177/210 EM |
| 6,615,638 B1 | | 9/2003 | Lochner et al. |
| 7,076,990 B2 | * | 7/2006 | Yoshikuwa .................. 73/1.13 |
| 7,250,577 B2 | * | 7/2007 | Schilling et al. .................. 177/1 |
| 2006/0207804 A1 | * | 9/2006 | Schilling et al. |
| 2006/0266562 A1 | * | 11/2006 | Genoud et al. |

FOREIGN PATENT DOCUMENTS

| | | |
|---|---|---|
| CH | 593 481 AS | 11/1975 |
| DE | 199 20 494 A1 | 6/2000 |
| DE | 102 42 118 A1 | 11/2003 |
| DE | 20 2004 011 793 U1 | 9/2005 |
| JP | 1-21237 | 8/1989 |
| JP | 11-83645 | 3/1999 |

* cited by examiner

*Primary Examiner*—Randy W Gibson
(74) *Attorney, Agent, or Firm*—Buchanan Ingersoll & Rooney PC

(57) ABSTRACT

A device to weigh objects of like nature has at least a first weighing module and a second weighing module. Each weighing module includes a load receiver and a weighing cell connected to each other through a force-transmitting rod. Each weighing cell is arranged in a design space whose dimensions in a plane that extends orthogonal to the direction of the load is delimited by the design spaces of adjacent weighing cells.

20 Claims, 7 Drawing Sheets

WEIGHING MODULE HAVING PORTIONS ARRANGED WITHIN THE DESIGN SPACE OF ANOTHER WEIGHING MODULE

RELATED APPLICATION

This application claims priority under 35 U.S.C. §119 to European Patent Application 05101845.5 filed in Europe on Mar. 10, 2005, the entire contents of which are hereby incorporated by reference.

FIELD

A device which serves to weigh objects of a uniform nature and which has a given number of weighing modules and an equal number of load receivers is disclosed, wherein each of the load receivers is connected to a weighing cell by way of a force-transmitting rod and wherein the force-transmitting rod is constrained by a parallel-guiding mechanism for guided motion in a direction of the load.

BACKGROUND INFORMATION

Exemplary devices are found in automated production- and testing systems where balances of a modular configuration—so-called weighing modules—are particularly well suited to be integrally incorporated into these systems. In essence, the balances used for this purpose are of the type where the display unit is arranged separately from the balance, for example in a system with a central display unit for a plurality of weighing modules. Integrated weighing modules of this kind are used in systems for the production and testing of small and relatively expensive parts, for example in filling- and packaging machines for tablets, capsules, ampoules, etc. in the pharmaceutical industry, or in the checking of ball bearings. The weighing of objects of the same kind, or also the so-called batch-weighing, is a process in which a plurality of loads need to be weighed individually, be it for the purpose of checking, dosage-dispensing, filling, or other applications, within a confined space.

Since a handling device such as a robotic arm with multiple grippers is used to put the weighing objects onto the individual load receivers of the weighing modules and to remove them after they have been weighed, the positions of the individual load receivers in relation to each other and in relation to the handling device have to be accurately and durably set.

Devices of this kind which are used for weighing objects of a uniform kind belong to the known state of the art. Predominantly, these devices are arrangements of weighing modules in a row or a two-dimensional array. Other arrangements are based on the concept of placing the weighing modules in a satellite-like arrangement around a serial line-up of load receivers which have to be matched to the distances between the feeder elements of an existing handling device, because the weighing module is often too large to allow an arrangement at the required close intervals.

A serial line-up of weighing modules is disclosed in DE 102 42 118 A1 and DE 199 20 494 A1, wherein four weighing modules are arranged in a row in an apparatus for weighing pharmaceutical receptacles, in particular ampoules, wherein before and after the filling the receptacles are brought to and removed from the weighing modules by a gripper device.

A two-dimensional arrangement of weighing cells is disclosed in JP 01212327 A, which describes a cost-effective method of producing a large number of weighing cells from a plate of spring material to which strain gauges are bonded as sensor elements. However, in contrast to a weighing cell that works according to the principle of electromagnetic force compensation, these weighing cells which work with strain gauges are not suitable for the area of application where masses in the range from micrograms to grams have to be determined.

In a weighing cell that functions according to the principle of electromagnetic force compensation, the force that is caused by a load on the weighing pan is compensated by a force-compensating member consisting of a permanent magnet and a coil, wherein the current is measured which flows through the coil to generate the compensating force. The measured value is in proportion to the load placed on the weighing pan. However, the measured value is also dependent on the position of the coil in the magnetic field of the permanent magnet and therefore, when determining the measurement value, the coil always has to have the same position in relation to the magnet. The position of the coil after applying the load is determined by way of a position sensor, and the current through the coil is increased until the load-related displacement of the coil in relation to the permanent magnet is compensated. At this point the coil current is measured, which represents a measure for the weight of the applied load. A weighing cell of this type is disclosed in CH 638 894 A5, wherein the weighing cell has a force-transmitting device which is arranged between the load receiver and the force-compensating member and which transmits the force generated by the load on the load receiver to the force-compensating member, reducing or magnifying the force depending on the load range.

A balance that works according to the same principle is disclosed in CH 593 481 A5. In this patent, the load receiver is coupled directly to the force-compensating member by way of a force-transmitting rod. The movable part of the position sensor is attached to the force-transmitting rod, while the stationary part of the position sensor is rigidly connected to the housing-based part of the weighing cell, or generally to the stationary part of the force-compensating member. This arrangement which is referred to as direct measuring principle is used in the range of small loads. As the position sensor has only a limited resolution, the precision of the measurement depends essentially on the resolution of the position sensor.

The load receiver and the coil of the force-compensating device have to be precisely guided in relation to the stationary part of the weighing cell. This is accomplished by a parallel-guiding mechanism whose movable parallelogram leg is connected to the force-transmitting rod and whose stationary portion is rigidly connected to the housing-based part of the weighing cell. The movable parallelogram leg and the stationary portion are connected to each other through two parallel-guiding members that are rigid against bending and have thin flexure joints. However, one could also use spring-like parallel-guiding members, in which case the thin flexure joints are omitted. When a load is placed on the load receiver, the force-transmitting rod moves in the direction of the load, whereby the parallel-guiding members are displaced and the thin flexure joints or spring-like elastic guide members are caused to bend. Analogous to a leaf spring element, these thin flexure joints or spring-like elastic guide members generate a moment of a magnitude that is in proportion to the angle of deflection of the parallel-guiding members, acting in the opposite direction of the bend, or a force acting in the opposite direction of the load. The more massive the thin flexure joints are designed, the larger is the load differential that is needed to produce the minimally detectable displacement of the position sensor. Thus, the dimensions of the flexure joints or the elastically flexible parallel-guiding members also significantly influence the resolution of the weighing cell.

Parallel-guiding mechanisms which guide a weighing pan in vertical motion by an upper and a lower parallel-guiding member often have adjustment means at two of the connecting areas between the parallel-guiding member and the stationary part, whereby these connecting areas can be adjusted in a given direction. Position-adjustable connecting areas of this kind which allow the weighing modules to be adjusted for eccentric load errors are disclosed in DE 27 10 788 A1.

The parallel-guiding mechanisms disclosed in the prior art have a disadvantage that a maximum allowable stress for the material used can impose limits on how far the thickness of the flexible joints can be reduced, and that the thinning-down of the flexure joints or the elastically flexible parallel-guiding members makes the parallel-guiding mechanism very susceptible to being damaged by overloads. To mitigate this problem, the parallel-guiding members can be made longer. This leads to a smaller angle of deflection associated with the minimal detectable displacement of the position sensing device. However, as a result of this design measure, the weighing modules that are used in a device for weighing objects of a uniform kind will have very unfavorable dimensions which lead to expensive, voluminous and complicated arrangements.

SUMMARY

An arrangement is disclosed for a weighing system that serves to weigh objects of a uniform nature, wherein the largest possible number of weighing modules is accommodated within a given surface area without negative consequences for the resolution of the measurement values due to the small distance between the modules.

A device is disclosed that serves to weigh objects of like nature, and has at least a first and a second weighing module, with each of the weighing modules comprising a load receiver and a weighing cell that are connected to each other by way of a force-transmitting rod. Each of the weighing cells is arranged within a design space whose dimensions in a plane that runs orthogonal to the load direction is delimited by the design spaces of adjacent weighing cells, and each weighing cell is equipped with a parallel-guiding mechanism that has at least one movable parallelogram leg, at least two parallel-guiding members, and at least one stationary part. The dimension of the design space in the direction of the load is delimited above and below the weighing module only by adjacent systems, for example by the operating space of a feeder device, and if the weighing modules are arranged on several different planes, the design space is delimited by the adjacent plane of the device or by the housing wall of the weighing device for objects of a uniform nature. The movable parallelogram leg of a parallel-guiding mechanism associated with the first weighing module is connected to the force-transmitting rod of the first weighing module. However, the stationary portion of the same parallel-guiding mechanism is arranged and fixedly mounted within the design space of the weighing cell of the second weighing module. With this design of the parallel-guiding mechanism of the force-transmitting rod, only a small restoring force is generated by the flexure joints and thus only a slight negative influence on the resolution of the measurement value.

The load receiver within the present context should be envisaged as a device of any shape which serves the purpose of receiving the object that is to be weighed. This includes in particular a load receiver platform on which one could also fasten a superstructure, and it also includes what is commonly referred to as a weighing pan. Arranged on the load receiver itself, there can also be an additional superstructure or adapter.

The individual weighing cells can be directly connected to each other through fastening means of different kinds. But the weighing modules can also be rigidly connected to each other in an indirect way by means of a receiving structure which accommodates the individual weighing modules. As a receiving structure, one could use for example plates with an appropriate hole pattern, intermediate or spacer elements, chassis frames and the like. The term hole pattern refers to a system of bore holes and cutouts with a defined geometric arrangement relative to each other in a body such as for example a plate. The parallel-guiding mechanism which reaches with its stationary portion and possibly with the parallel-guiding members beyond the design space of the associated weighing cell can be arranged in such a way in relation to other weighing modules that the free space above or below the weighing cells is optimally utilized. Depending on the design configuration of the device for weighing objects of a uniform nature, the stationary portion of the individual parallel-guiding mechanisms is connected to a fastening area which is formed directly on a further weighing cell or on the receiving structure.

The generic category of the fastening means for the rigid connection of the weighing cells among each other and for the connection of the stationary portion to the fastening areas encompasses form-fitting releasable or non-releasable connector elements such as screws, pins, rivets, bolts and the like, but also projections, pockets, lugs, bore holes and recesses. Even displacement-limiting linear guides and the like are suitable as fastening means or attachment areas. As further possibilities, the weighing cells, parallel-guiding mechanisms and, if applicable, the receiving structures can be connected to each other by clamping, wedging, snapping, forging, adhesive bonding, soldering, welding, potting, pressing, shrink-fitting and similar techniques used in the sense of an attachment means.

Depending on the length of the parallel-guiding members, they can also span across several weighing cells so that several weighing modules lie between a stationary portion and the associated weighing module.

The alignment of the parallel-guiding mechanisms in accordance with the spatial directions of the edges of the weighing cells is not a necessary requirement. In contrast to the orientation of the weighing cells in the plane that extends orthogonal to the load direction, it is possible, for example, to align the parallel-guiding mechanisms diagonally in the plane that extends orthogonal to the load direction.

At least two connecting areas between the stationary portion and the parallel-guiding members can be equipped with adjustment devices which allow an adjustment of the distance between the connecting areas that connect the parallel-guiding members to the stationary portion.

In regard to the design of the parallel-guiding members, several possibilities present themselves. The parallel-guiding members can be designed, e.g., with spring-like elasticity and with rigid connections to the stationary portion and the movable parallelogram leg. It is also possible to use comparatively rigid parallel-guiding members which are connected to the stationary portion and to the movable parallelogram leg through thin flexure joints.

In one exemplary embodiment, a pair of upper parallel-guiding members and a pair of lower parallel-guiding members of a parallel-guiding mechanism are each arranged in the shape of a V, i.e. converging towards the movable parallelogram leg.

In another exemplary embodiment of a parallel-guiding mechanism, an upper parallel-guiding member and a lower parallel-guiding member are arranged parallel to each other in the three spatial dimensions. If one of the two parallel-guiding members is connected to the stationary portion by at least two thin flexure joints, it is possible to adjust the weighing module to be free of eccentric loading errors (also referred to as corner load errors) by means of an adjustment device, for example an adjusting screw, a wedge or the like.

The parallel-guiding mechanisms can be assembled of individual components, with the individual parts such as the stationary portion, the movable parallelogram leg, the thin flexible joints, and the parallel-guiding members being connected to each other by fastening means such as screws, rivets and the like.

The parallel-guiding mechanisms can be made of a monolithic material block wherein material-free spaces are produced by drilling and milling, but also by means of spark erosion.

In yet another exemplary embodiment, at least two weighing modules are arranged side-by-side, with the parallel-guiding mechanisms being oriented in opposite directions. The stationary portion of the parallel-guiding mechanism of the first weighing module is rigidly connected to the fastening area that is formed on the second weighing cell, and the stationary portion of the parallel-guiding mechanism of the second weighing module is rigidly connected to the fastening area that is formed on the first weighing cell. The parallel-guiding members of the two parallel-guiding mechanisms can be arranged in different planes, so that they are not touching each other and there is no effect on the weighing results. Of course, the parallel-guiding mechanisms can extend through each other's material-free portions, so that the parallel-guiding members of the first parallel-guiding mechanism are arranged between the parallel-guiding members of the second parallel-guiding mechanism. One could also use a kind of layered arrangement wherein the upper parallel-guiding members of the first parallel-guiding mechanism pass between the parallel-guiding members of the second parallel-guiding mechanism and the lower parallel-guiding members of the second parallel-guiding mechanism pass between the parallel-guiding members of the first parallel-guiding mechanism.

An arrangement in groups of two for the weighing modules as described above also facilitates the repair of a device for weighing objects of like nature because, for example, only two of the weighing modules at a time have to be uninstalled, without having to remove parts from the adjacent weighing modules. This grouping in two's can also be accomplished by designing the weighing cell housings of two adjacent weighing modules as a combined unit in one piece.

In yet another exemplary embodiment, at least two weighing modules are arranged side-by-side, with the parallel-guiding mechanisms of all weighing modules being oriented identically. In such an embodiment, the stationary portion of the first weighing module can be attached to a fastening area of the receiving structure of the weighing device for objects of a uniform nature, or an empty weighing cell housing can be arranged ahead of, and connected to, the first weighing module as a fastening area. This design has an advantage that all parallel-guiding mechanisms can be arranged in the same plane. The weighing cell housings that are arranged in this way in a row and combined in a linear array can be configured as one piece. It is likewise possible to unite all weighing cell housings in one plate, so that all of the weighing cell housings that are formed out of one plate are monolithically connected to each other.

In one exemplary embodiment, the force-transmitting rods that are connected to the load receivers cross through the weighing cells. The upper parallel-guiding members are connected to the force-transmitting rods of their respective weighing cells at a place between the load receiver and the weighing cell. The lower parallel-guiding members are arranged on the side of the weighing cells that faces away from the load receiver and are connected to the force-transmitting rods which pass through the weighing cells.

Of course, the force-transmitting rod can also be arranged along the side of the weighing cell, in which case an additional connection, for example in the form of a lever or a coupling, has to be introduced between the weighing cell and the associated force-transmitting rod.

Each of the weighing modules can have its own parallel-guiding mechanism, whether formed monolithically out of a material block or assembled from individual components.

In yet another exemplary embodiment, the parallel-guiding mechanisms are combined in a plate, be it that the parallel-guiding mechanisms are assembled of individual components and connected to the plate or that they are formed directly out of the plate. The plate either spans across all weighing cells and thus contains all of the parallel-guiding mechanisms of the entire device for weighing objects of a uniform nature, or the parallel-guiding mechanisms are distributed over several plates which are arranged side-by-side but not necessarily on the same plane, orthogonal to the direction of the load. Of course, the weighing cells have to be rigidly connected to the plate that forms the stationary portion of the parallel-guiding mechanisms, with the movable parallelogram legs of the parallel-guiding mechanisms—which are either formed out of the plate or attached to the plate—being connected to the force-transmitting rods of their respective weighing cells.

In yet another exemplary embodiment of this arrangement of weighing cells and plates, all upper parallel-guiding members are arranged on an upper plate and all lower parallel-guiding members are arranged on a lower plate. The movable parallelogram-leg end portions of the upper plate are connected to the force-transmitting rods of the respective weighing cells between load receiver and weighing cell. The movable-parallelogram leg end portions of the lower plate, which are arranged on the side of the weighing cells that faces away from the load receivers are connected to the associated force-transmitting rods which cross through the weighing cells.

In yet another exemplary embodiment, the weighing modules are arranged above each other in at least two planes, wherein the weighing modules in each plane are arranged either in a row or in a two-dimensional array. In order to allow the force-transmitting rods of a lower plane to extend in a suitable manner without outside of the weighing modules of the upper planes, the weighing modules of a plane can be arranged with an offset relative to the weighing modules in the plane above and/or below. Each weighing module has a parallel-guiding mechanism that is completely independent of the other weighing modules.

In yet another exemplary embodiment, the weighing modules are arranged in at least two planes above each other, wherein the parallel-guiding mechanisms are combined in plates. If in each of the planes the upper and lower parallel-guiding members of the weighing modules are combined in an upper and a lower plate, the possibility presents itself to combine plates that are arranged between two planes, so that the combined plate that lies between the planes carries parallel-guiding members belonging to the weighing cells of the upper plane as well as parallel-guiding members belonging to the weighing cells of the lower plane. The number of planes on which the weighing modules can be arranged depends on the dimensions of the weighing modules and on the required number of load receivers, wherein the latter number, in turn, depends on the way in which the weighing objects are transported to the load receivers.

If weighing modules in an arrangement with a plurality of planes are equipped with force-transmitting rods of different lengths, for example in order to arrange the load receivers in one plane, the weighing modules will have different dead loads. These different dead loads can be made equal by means of a compensating weight, for example by adding a screw to the weighing modules with the shorter force-transmitting rods. If the spatial conditions permit, the compensating weight, more specifically the dead-load compensating weight can be attached in the connecting area between the force-transmitting rod and the movable parallelogram leg of the parallel-guiding mechanism.

DESCRIPTION OF THE DRAWINGS

Details of the device for weighing objects of a uniform nature may be learned from the description of the embodiments represented in the drawings, wherein.

DETAILED DESCRIPTION

Figure 1:
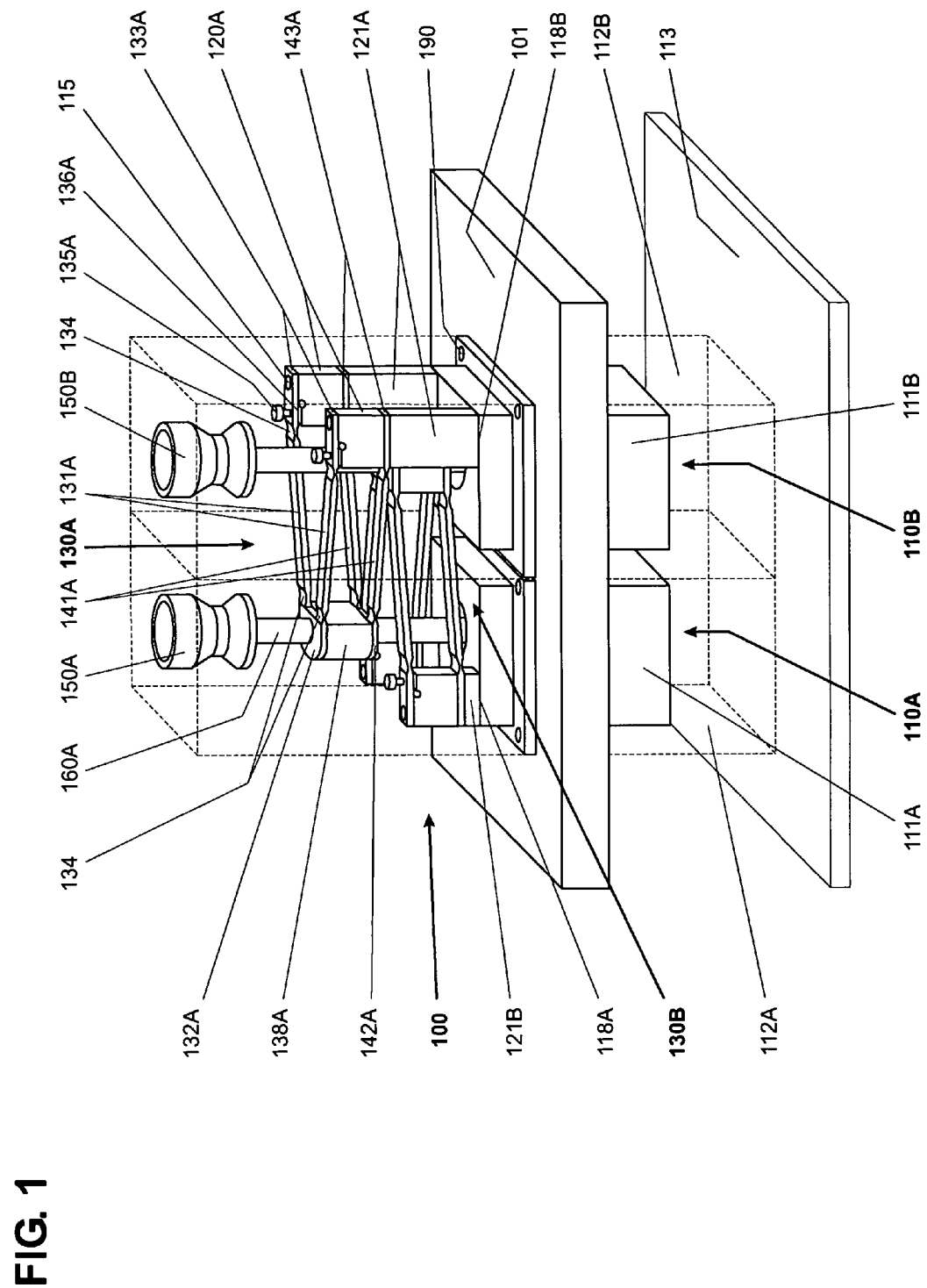
FIG. 1 represents a perspective view of an exemplary device with two weighing modules whose parallel-guiding mechanisms are oriented in opposite directions and above each other, and it also schematically shows spatial design spaces of exemplary individual weighing cells.

FIG. 1 shows a perspective representation of a device 100 for weighing objects of a uniform nature, with two weighing modules 110A, 110B and their respective weighing cells 111A, 111B as well as their respectively associated load receivers 150A, 150B. Each of the weighing cells 111A, 111B is arranged in a spatial design space 112A, 112B. The dimensions of each design space in the plane that runs orthogonal to the load direction are delimited by the spatial spaces of neighboring weighing cells, while the dimension in the direction of the load is delimited, e.g., by a housing floor 113 that is solidly connected to the receiving structure. The spatial limitations on the design spaces 112A, 112B against the direction of the load are constituted for example by the upper rims of the load receivers 150A, 150B, because the space above the load receivers 150A, 150B is normally taken up for example by the operating space of a feeder device (not shown).

The weighing module 110A is rigidly connected to a receiving structure 101 by fastening means 190, for example by screws. The weighing cell 111A of the weighing module 110A has a coil (not shown) which is arranged in the interior of the weighing cell 111A and connected to a force-transmitting rod 160A. Attached to the upper end of the force-transmitting rod 160A is the load receiver 150A. Also connected to the force-transmitting rod 160A is the movable parallelogram leg of a parallel-guiding mechanism 130A. This parallel-guiding mechanism has two upper parallel-guiding members 131A and two lower parallel-guiding members 141A, which are arranged in V-shaped pairs that converge towards the movable parallelogram leg and are connected to the latter through thin flexure joints 134, wherein the movable parallelogram leg is comprised of an upper movable end portion 132A and a lower movable end portion 142A which are held at a fixed distance from each other by the spacer block 138A. The stationary portion of the parallel-guiding mechanism 130A is comprised of the upper stationary end portions 133A which are connected through thin flexure joints 134 to the upper parallel-guiding members 131A, of the lower stationary end portions 143A which are connected likewise through thin flexure joints 134 to the lower parallel-guiding members 141A, and of the spacer blocks 120A which hold the upper stationary end portions 133A and the lower stationary end portions 143A at the same fixed distance from each other as the spacer block 138A. The stationary portion of the parallel-guiding mechanism 130A is rigidly connected to the weighing cell 111B of the weighing module 110B by screws 115 reaching through spacer blocks 121A. To allow an adjustment of the parallel-guiding mechanism 130A for corner load errors, the upper stationary end portions 133a are equipped with an adjustment device 135A in the vicinity of the thin flexure joints 134, whereby the positions of the thin flexure joints relative to the stationary portion can be adjusted in the opposite direction of the load. In order to also allow an adjustment in the same direction as the load, the spacer blocks 120A have a clearance gap 136A in the area of the adjustment device 135A.

The description of the weighing module 110A is applicable analogously to the weighing module 110B and its parallel-guiding mechanism 130B, wherein the spacer blocks 121A of the stationary portion of the parallel-guiding mechanism 130A are designed considerably taller than the spacer blocks 121B of the parallel-guiding mechanism 130B, so that the parallel-guiding mechanism 130A is placed above the parallel-guiding mechanism 130B.

Of course, the foregoing arrangement is not limited to two weighing modules 110A, 110B. Any desired number of weighing modules can be arranged in a two-dimensional array, behind each other as well as side-by-side of each other, grouped into pairs of neighboring weighing cells as has been described and illustrated in FIG. 1.

Figure 2:
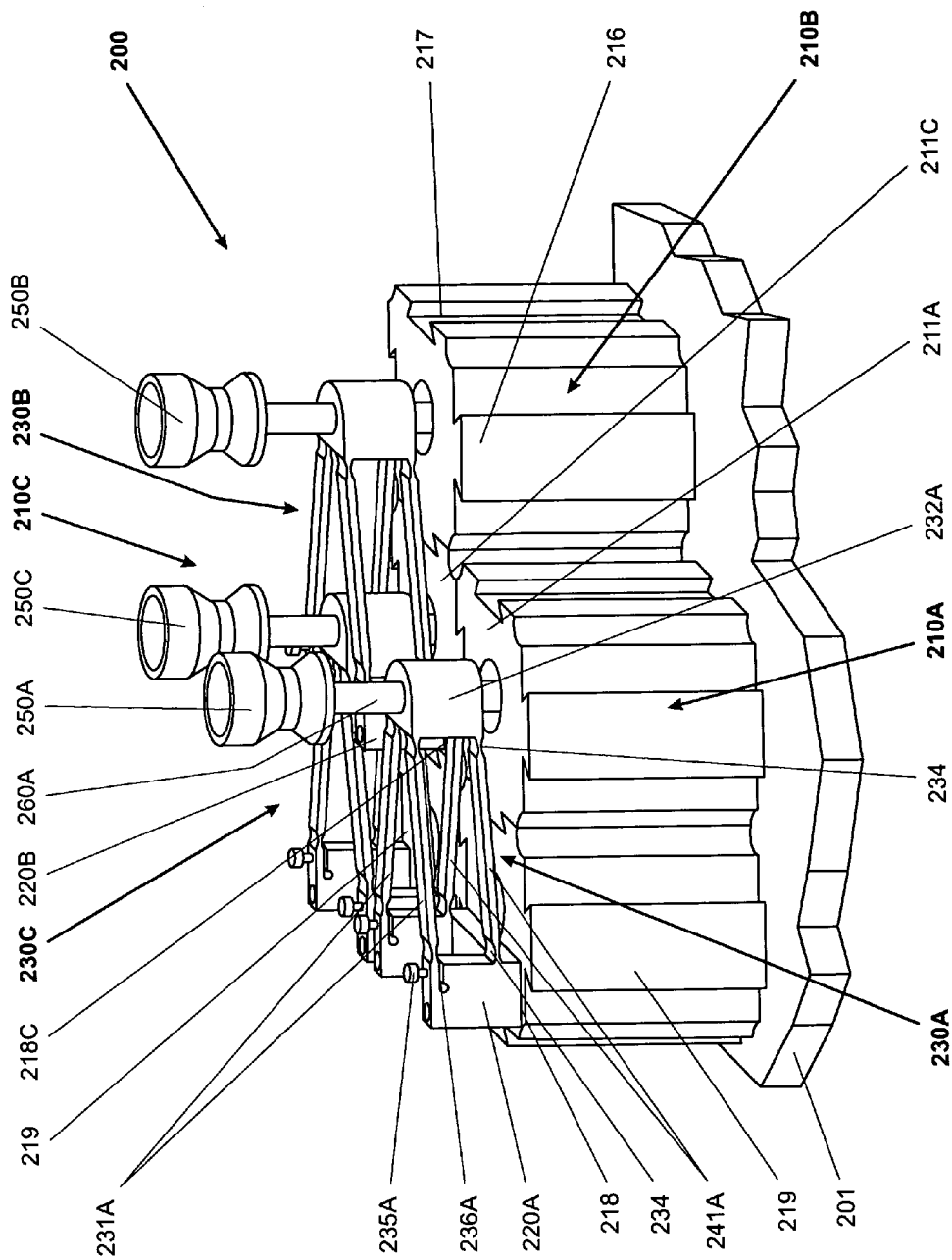
FIG. 2 represents a perspective view of an exemplary device with three weighing modules and two empty weighing cell housings, with the parallel-guiding mechanisms arranged with the same orientation and nested inside each other.

FIG. 2 shows a perspective representation of a device 200 for weighing objects of a uniform nature, with the weighing modules 210A, 210B, 210C and their respective weighing cells and associated load receivers 250A, 250B, 250C as well as their respective parallel-guiding mechanisms 230A, 230B, 230C. Each of the weighing cells of the weighing modules 210A, 210B, 210C is arranged within a design space (not shown), wherein the dimensions of each of the design spaces are delimited in an analogous way as has been described above for the design spaces in FIG. 1. Arranged in front of the first row of weighing modules 210A, 210C are the empty weighing cell housings 219 which only serve the purpose, by way of the fastening areas 218, to connect the parallel-guiding mechanisms 230A and 230C to a receiving structure 201.

The weighing module 210A is rigidly connected to the receiving structure 201 by way of fastening means, for example screws that are not shown in the drawing, and it includes a weighing cell 211A inside of which a coil (not shown) is arranged which is connected to a force-transmitting rod 260A. Attached to the upper end of the force-transmitting rod 260A is the load receiver 250A. Also attached to the force-transmitting rod 260A is the movable parallelogram leg 232A of a parallel-guiding mechanism 230A that is monolithically formed out of a material block. The parallel-guiding mechanism 230A has two upper parallel-guiding members 231A and two lower parallel-guiding members 241A which are arranged in V-shaped pairs that converge towards the movable parallelogram leg 232A and are connected to the latter through thin flexure joints 234. The stationary portion 220A of the parallel-guiding mechanism 230A is likewise connected through thin flexure joints 234 to the upper parallel-guiding members 231A and to the lower parallel-guiding members 241A, as well as rigidly attached to the fastening area 218 of the empty weighing cell housing 219.

To allow an adjustment of the parallel-guiding mechanism 230A for corner load errors, the stationary portion 220A is equipped with adjustment devices 235A in the vicinity of the thin flexure joints 234, whereby the positions of the thin flexure joints 234 relative to the stationary portion 220A can be adjusted in the opposite direction of the load. In order to also allow an adjustment in the same direction as the load, the stationary portion 220A has two clearance gaps 236A in the area of the adjustment device 235A.

The description of the weighing module 210A is applicable analogously to the weighing module 210C as well as 210B, wherein the stationary portion 220B is rigidly connected to the fastening area 218C that is formed on the weighing cell 211C.

Of course, the foregoing arrangement is not limited to three weighing modules 210A, 210B, 210C. Any desired number of weighing modules can be arranged in a two-dimensional array behind each other and side-by-side of each other as described and illustrated. If the positioning of the weighing modules relative to each other needs to be securely registered so that their load receivers match up with a feeder device, there can be positioning means formed on the weighing cells, for example with rails 216 and grooves 217, with each rail 216 of one weighing cell meshing with the groove 217 of the neighboring weighing cell.

Figure 3:
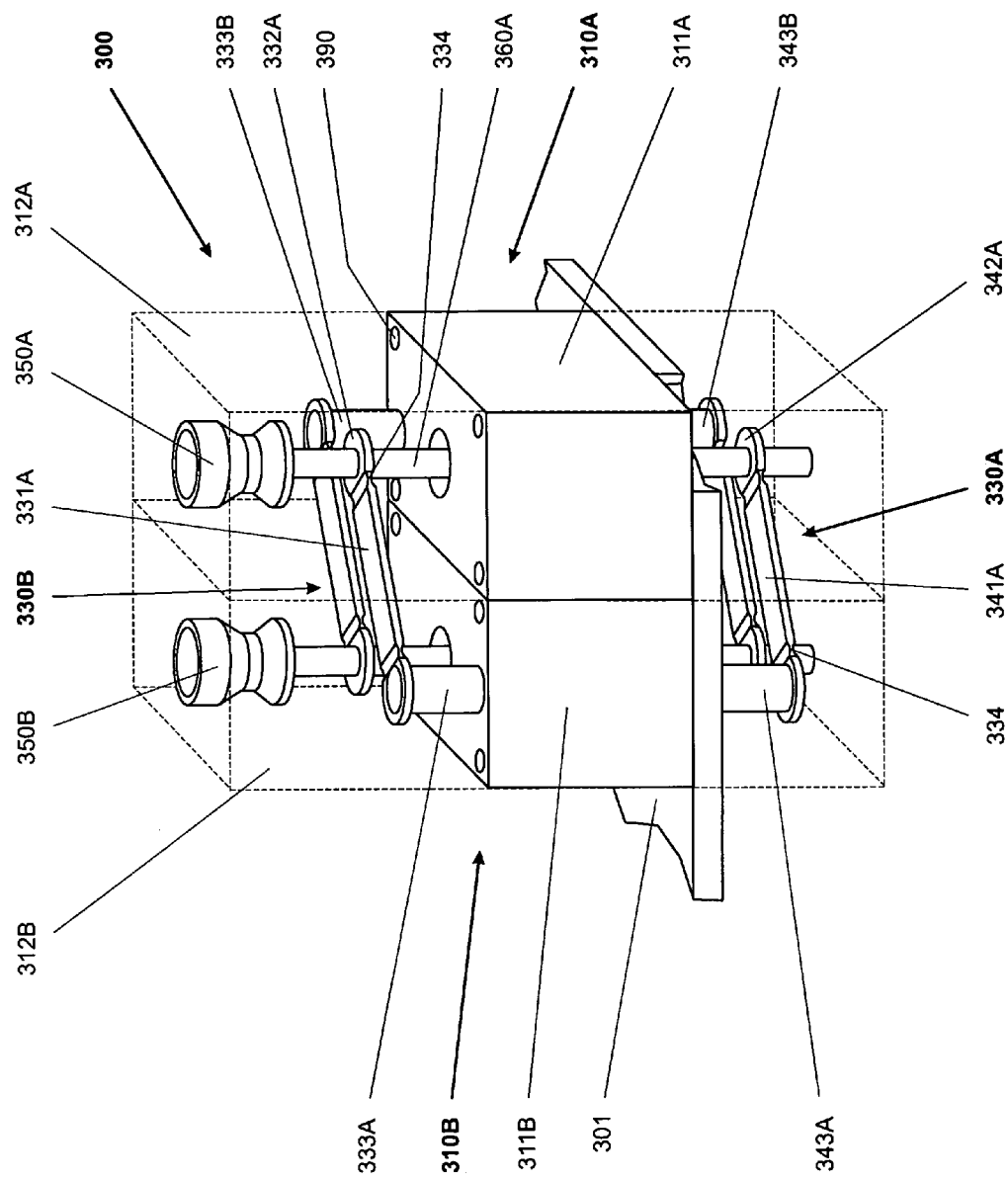
FIG. 3 represents a perspective view of an exemplary device with two weighing modules and the schematically indicated spatial design spaces of the individual weighing cells, wherein the parallel-guiding mechanisms of the weighing modules are arranged above and below the weighing cells.

FIG. 3 shows a perspective representation of a device 300 for weighing objects of a uniform nature, with two weighing modules 310A, 310B and their respective weighing cells 311A, 311B, each with its associated load receiver 350A, 350B. Each of the weighing cells 311A, 311B is arranged within a design space 312A, 312B. The dimensions of each of the design spaces in the plane that extends orthogonal to the direction of the load are delimited by the design spaces of neighboring weighing cells. The dimension in the direction of the load is delimited for example by a housing floor that is solidly connected to the receiving structure. The spatial limitations on the design spaces 312A, 312B against the direction of the load are constituted for example by the upper rims of the load receivers 350A, 350B, because the space above the load receivers 350A, 350B is normally taken up for example by the operating space of a feeder device (not shown).

The weighing module 310A is rigidly connected to a receiving structure 301 by fastening means 390, for example by screws. The weighing cell 311A of the weighing module 310A has a coil (not shown) which is arranged in the interior of the weighing cell 311A and connected to a force-transmitting rod 360A which passes through the weighing cell 311A in the direction of the load. Attached to the upper end of the force-transmitting rod 360A is the load receiver 350A.

Arranged between the load receiver 350A and the weighing cell 311A is an upper parallel-guiding member 331A which is connected through thin flexure joints 334 to the upper movable end portion 332A and the upper stationary end portion 333A of the parallel-guiding mechanism 330A. Analogously, on the side of the weighing cell 311A that faces away from the load receiver 350A, there is a lower parallel-guiding member 341A arranged which is connected through thin flexure joints 334 to the lower movable end portion 342A and the lower stationary end portion 343A of the parallel-guiding mechanism 330A. The upper stationary end portion 333A and the lower stationary end portion 343A are rigidly connected to the weighing cell 311B of the weighing module 310B.

The description of the weighing module 310A is applicable analogously to the weighing module 310B and its parallel-guiding mechanism 330B, wherein the upper stationary end portion 333B and the lower stationary end portion 343B of the parallel-guiding mechanism 330A are rigidly connected to the weighing cell 311A of the weighing module 310A.

Of course, the foregoing arrangement is not limited to two weighing modules 310A, 310B. Any desired number of weighing modules can be arranged in a two-dimensional array, behind each other as well as side-by-side of each other, grouped into pairs of neighboring weighing cells as has been described and illustrated. However, this grouping is not a necessary requirement; other arrangements are likewise possible.

Figure 4:
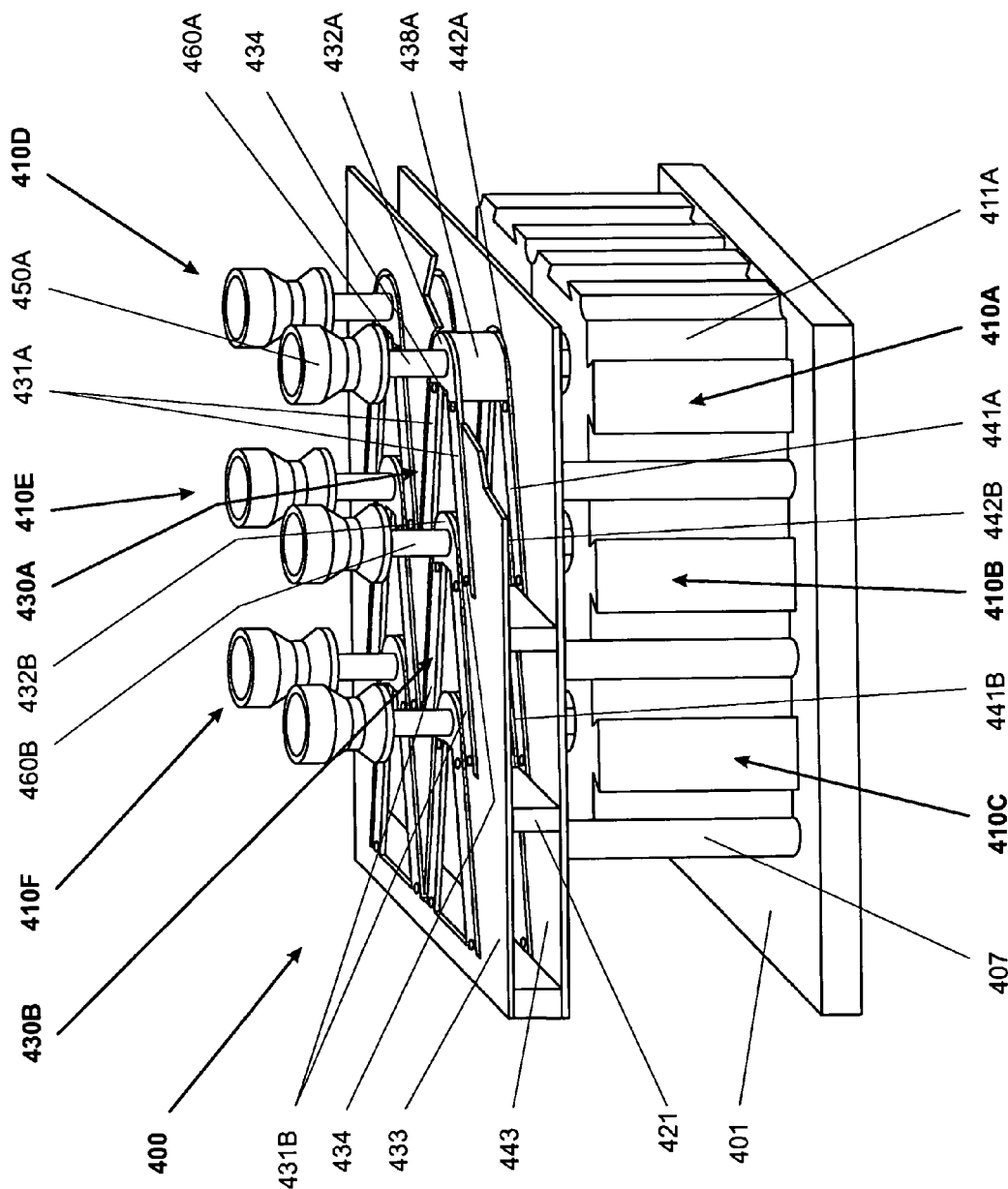
FIG. 4 represents a perspective view of an exemplary device with six weighing modules whose parallel-guiding mechanisms are constrained by stationary portions arranged in plate-shaped compounds that are positioned between the load receivers and the weighing cells.

FIG. 4 shows a perspective representation of a device 400 for weighing objects of a uniform nature, with a two-dimensional arrangement of the weighing modules 410A, 410B, 410C, 410D, 410E, 410F.

The weighing module 410A is rigidly connected to a receiving structure 401 by fastening means (not shown), for example by screws, and includes a weighing cell 411A with a coil (not shown) that is arranged in the interior of the weighing cell 411A and connected to a force-transmitting rod 460A. Attached to the upper end of the force-transmitting rod 460A is the load receiver 450A. Also connected to the force-transmitting rod 460A is the upper end portion 432A of the movable parallelogram leg. Two upper parallel-guiding members 431A are arranged in a V-shaped pair, converging towards the upper movable end portion 432A and connected to the latter through thin flexure joints 434. The parallel-guiding members 431A and the movable upper end portions 432A are connected to the upper compound 433 of shared stationary portions through thin flexure joints 434.

The upper parallel-guiding members, for example 431A, 431B which are of analogous configuration as in the weighing module 410A, the upper stationary end portions such as, e.g., 432A, as well as the thin flexure joints 434 of all of the weighing modules 410A, 410B, 410C, 410D, 410E, 410F are formed out of monolithic plate, wherein the material-free spaces can be produced by milling, drilling, stamping, laser-cutting or water-jet cutting, or by means of spark erosion and the like. Thus, all of the parallel-guiding mechanisms share the same stationary upper end-portion compound 433 and are, as a generic feature, connected to each other.

A second plate of totally identical design represents the lower compound 443 of stationary end portions, wherein the lower movable end portions, for example 442A, 442B are connected to the lower stationary-end compound by the lower parallel-guiding members 441A, 441B. The positions of the lower movable end portions, e.g. 442A, 442B, which are formed out of the plate, have to precisely match the positions of the respective upper movable end portions 432A, 432B in connection with the force-transmitting rods 460A, 460B in order to form the parallel-guiding mechanisms 430A, 430B. The upper stationary end-portion compound 433 and the lower stationary end-portion compound 443 are rigidly connected to each other through spacer blocks 421. The two stationary end-portion compounds 433, 443 are rigidly attached to the receiving structure 401 through the supports 407. The spacer blocks 421 have recesses in the areas of the parallel-guiding members and the movable parallelogram legs, so as not to interfere with the mobility of the parallel-guiding mechanism. Of course, the spacer blocks 421 could also be completely interrupted in these areas. The only important points for the proper functioning of this arrangement are the support and precise spacing of the thin flexure joints 434 of the upper stationary-end compound 433 in relation to the thin flexure joints 434 of the lower stationary-end compound 443.

In the weighing module 410A, the upper movable end portion 432A and the lower movable end portion 442A are connected to the force-transmitting rod 460A of the weighing module 410A, wherein the spacer block 438A holds the movable end portions 432A and 442A at the same distance from each other as the upper stationary-end compound 433 has from the lower stationary-end compound 443.

At the weighing module 410A, the upper movable end portion 432A and the lower movable end portion 442A are connected with the force transmitting rod 460A of the weighing module 410A, whereby the spacer block 438A spaces the movable end portions 432A and 442A in same distance as the distance of the upper compound of stationary end portions 433 to the lower compound of stationary end portions 443.

In the same way as shown for the weighing module 410A, all of the force-transmitting rods of the weighing modules 410A, 410B, 410C, 410D, 410E, 410F, are connected with their respectively associated movable parallelogram legs.

Of course, the foregoing arrangement is not limited to six weighing modules 410A, 410B, 410C, 410D, 410E, 410F. Any desired number of weighing modules can be arranged in a two-dimensional array, behind each other as well as side-by-side of each other, wherein the upper compound 433 of stationary end portions and the lower compound 443 of stationary end portions need to be matched to the number of weighing cells.

Figure 5:
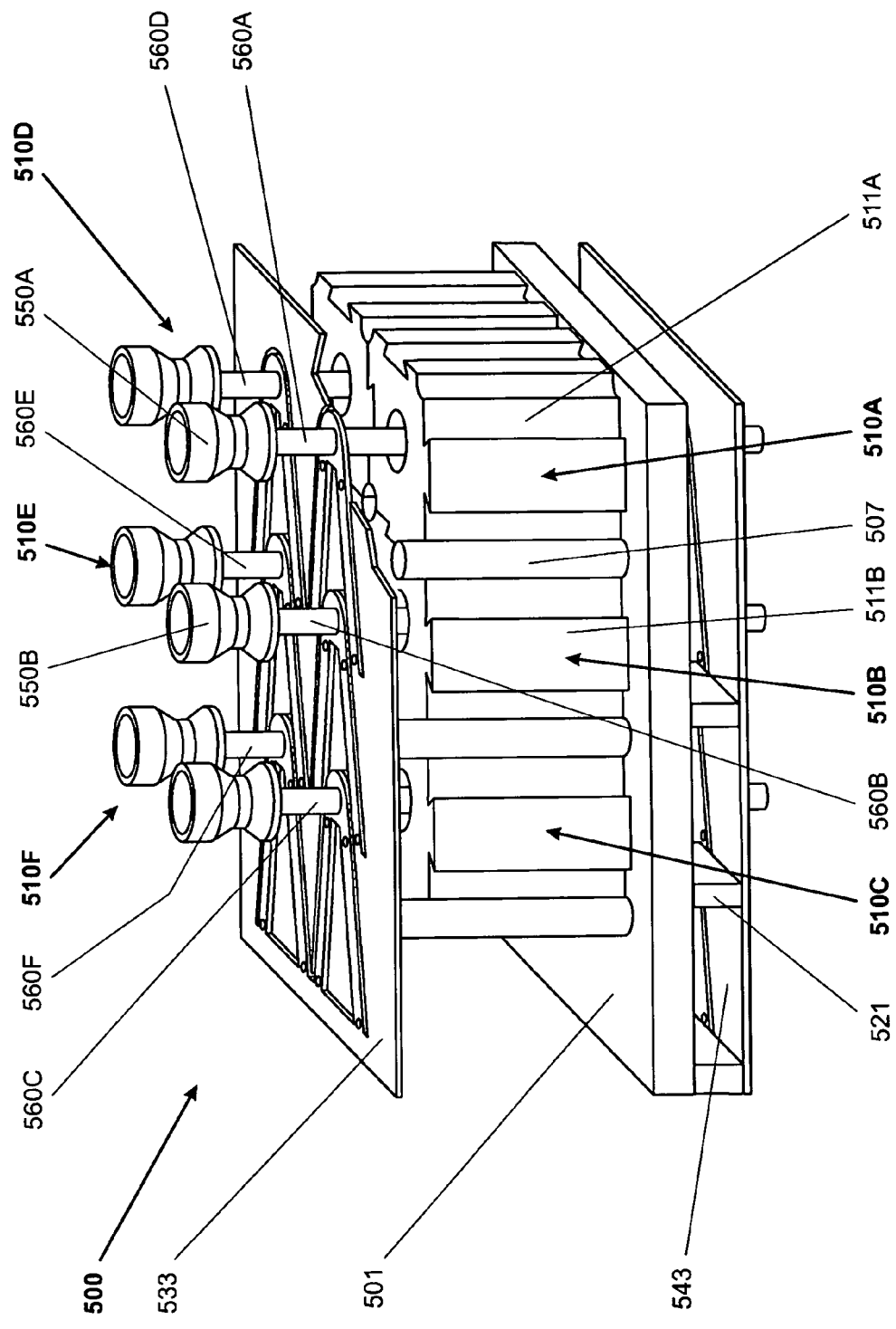
FIG. 5 represents a perspective view of an exemplary device with six weighing modules whose parallel-guiding mechanisms are constrained by combined stationary portions in the shape of plate-shaped compounds, wherein the upper compound is positioned between the load receivers and the weighing cells and the lower compound is arranged on the side of the weighing cells that faces away from the load receivers.

FIG. 5 shows a perspective representation of a device 500 for weighing objects of a uniform nature, with a two-dimensional arrangement of weighing modules 510A, 510B, 510C, 510D, 510E, 510F, which are rigidly connected to a receiving structure. This device 500 for weighing objects of a uniform nature is to a large extent analogous to the device described in the context of FIG. 4. It has an upper compound 533 of stationary end portions and a lower compound 543 of stationary end portions. Unlike the arrangement of FIG. 4, the lower compound 543 of stationary end portions is rigidly connected through spacer blocks 521 to the side of the receiving structure 501 that faces away from the weighing modules. The upper compound 533 of stationary end portions is rigidly connected to the receiving structure through supports 507. The force-transmitting rods such as, e.g., 560A, 560B traverse their respectively associated weighing cells 511A, 511B and the receiving structure in the direction of the load. The upper movable end portions associated with the weighing modules 510A, 510B, 510C, 510D, 510E, 510F as well as the lower movable end portions are connected to the respective force-transmitting rods 560A, 560B, 560C, 560D, 560E, 560F.

Of course, the foregoing arrangement is not limited to six weighing modules 510A, 510B, 510C, 510D, 510E, 510F. Any desired number of weighing modules can be arranged in a two-dimensional array, behind each other as well as side-by-side of each other, wherein the upper compound 533 of stationary end portions and the lower compound 543 of stationary end portions need to be matched to the number of weighing cells.

Figure 6:
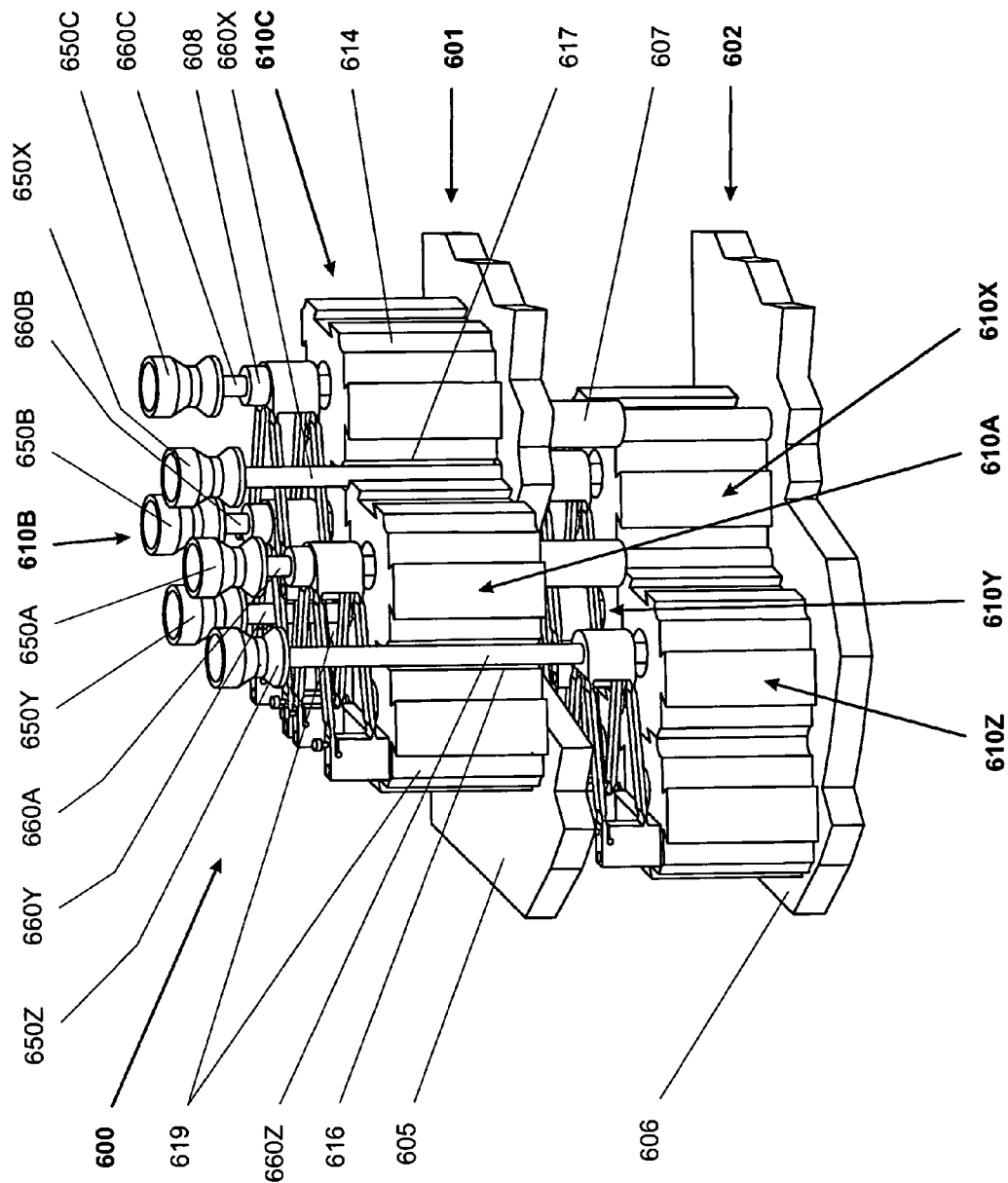
FIG. 6 represents a perspective view of an exemplary device with two planes, each of which has three weighing modules and two empty weighing cell housings, with the parallel-guiding mechanisms arranged in the same orientation and nested inside each other.

FIG. 6 shows a perspective representation of a device 600 for weighing objects of a uniform nature, where two two-dimensional arrays of the kind shown in FIG. 2 are arranged, respectively, on a first plane 601 and on a second plane 602. The weighing modules 610A, 610B, 610C of the upper plane 601 are rigidly mounted on a receiving structure 605, while the weighing modules 610X, 610Y, 610Z of the lower plane 602 are rigidly mounted on a receiving structure 606. The two receiving structures 605, 606 are rigidly connected to each other through the support 607.

The setup of weighing modules in the plane 601 is arranged with a lateral offset in relation to the setup of the plane 602, so that the force-transmitting rods 660X, 660Y, 660Z of the weighing modules 610X, 610Y, 610Z of the lower plane 602 can reach up through the lateral spaces outside of the weighing modules 610A, 610B, 610C of the upper plane 601, to allow the load receivers 650X, 650Y, 650Z to be arranged on the same plane orthogonal to the direction of the load as the load receivers 650A, 650B, 650C. The weighing cells 611A, 611B, 611C of the weighing modules 610A, 610B, 610C as well as the empty load cell housings 619 can have grooves 614 extending in the direction of the load along the corners, with a cross-section shaped like a quadrant of a circle, so that when four weighing cells are joined together, a channel 616 of circular cross-section is formed in the corner area 617. These channels allow the passage of the force-transmitting rods 660X, 660Y, 660Z of the lower plane 602.

In an exemplary embodiment, every weighing cell, regardless of whether it lies in the upper plane 601 or in the lower plane 602, is under the same conditions with regard to the load represented by the load receiver and the force-transmitting rod, i.e., the so-called preload. Since in particular the force-transmitting rods 660X, 660Y, 660Z are significantly longer than the force-transmitting rods 660A, 660B, 660C and therefore have a larger mass, the difference in the preload between the weighing modules of the upper plane 601 and the lower plane 602 is canceled by a preload-compensating weight 608, with one preload-compensating weight 608 being attached to the force-transmitting rod of each of the weighing modules 660A, 660B, 660C of the upper plane 601.

Of course, the foregoing arrangement is not limited to three weighing modules 610A, 610B, 610C and 610X, 610Y, 610Z, respectively, in each plane. Any desired number of weighing modules can be arranged in each of the planes 601, 602 in a two-dimensional array, behind each other as well as side-by-side of each other, as described above.

Figure 7:
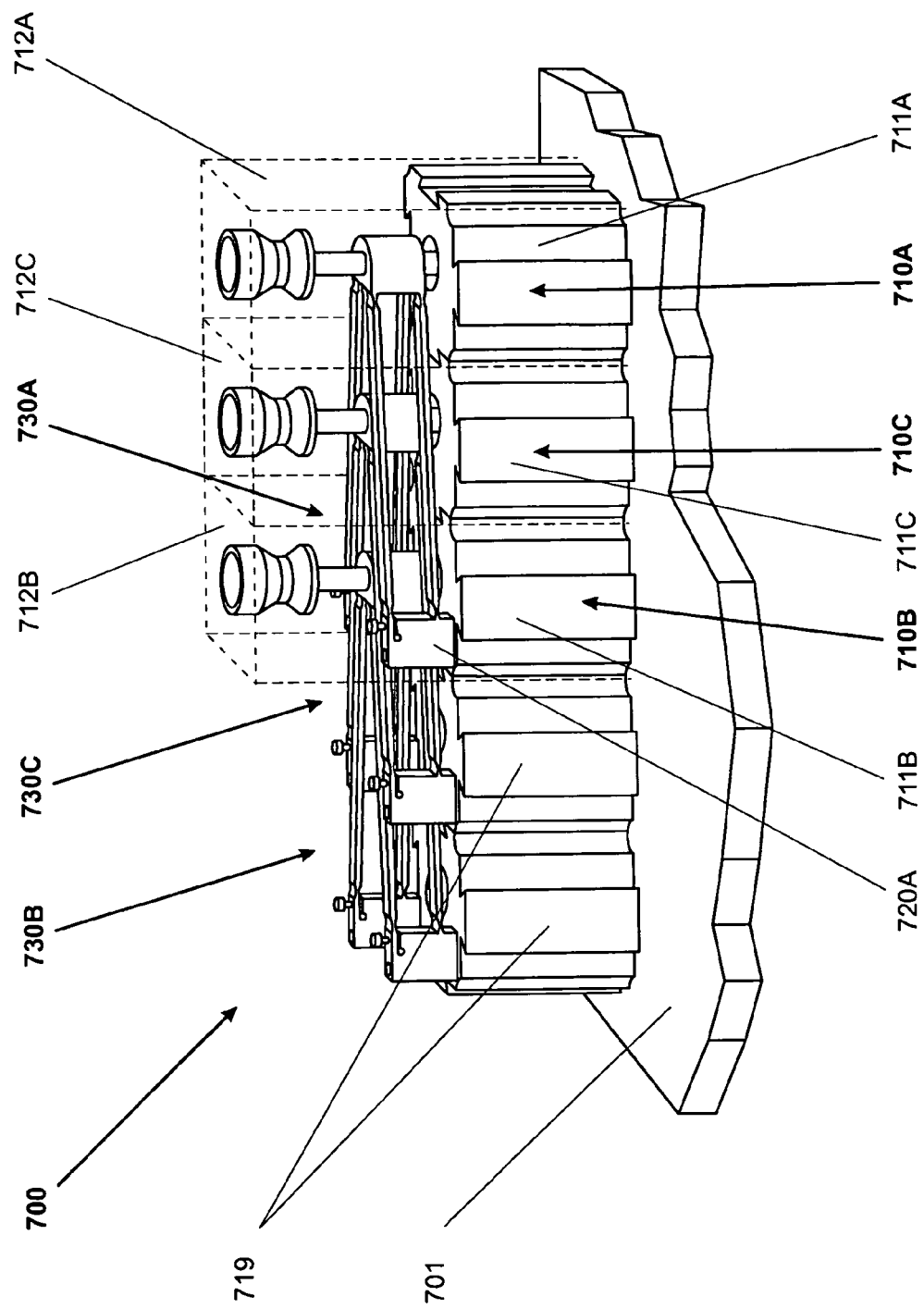
FIG. 7 represents a perspective view of an exemplary device with two weighing modules and two empty weighing cell housings planes, with the parallel-guiding mechanisms arranged in the same orientation and nested inside each other, wherein the parallel-guiding mechanism of one weighing module crosses completely through the spatial design space of a further weighing cell.

FIG. 7 shows a perspective representation of a device 700 for weighing objects of a uniform nature, consisting of three weighing modules 710A, 710B, 710C with their respective weighing cells 711A, 711B, 711C and two empty weighing cell housings 719, wherein the weighing cells and empty weighing cell housings are rigidly connected by a receiving structure 701. The design architecture is substantially analogous to the design illustrated in FIG. 2, with the design spaces 712A, 712B, 712C being likewise indicated. However, a third weighing cell 711C is arranged between the first weighing cell 711A and the second weighing cell 711B, so that the parallel-guiding mechanism 730A of the first weighing module 710A passes through the design space 712C of the third weigh cell 711C and thus spans across the weighing cell 711C. The stationary portion 720A of the parallel-guiding mechanism 730A of the first weighing module 710A is arranged in the design space 712B of the weighing cell 711B and rigidly connected to the receiving structure 701 through the weighing cell 711B. The stationary portions of the parallel-guiding mechanisms 730B, 730C, on the other hand, are rigidly connected to the receiving structure 701 through the empty weighing cell housings 719 that are positioned in front of the weighing modules 710A, 710B, 710C.

Of course, the foregoing arrangement is not limited to three weighing modules 710A, 710B, 710C. Any desired number of weighing modules can be arranged in a two-dimensional array, behind each other as well as side-by-side of each other as described hereinabove.

The exemplary devices of the present invention have been described and illustrated in various exemplary configurations. However, guided by the teachings of the invention, persons of ordinary skill in the art will be able to realize further embodiments. The disclosed exemplary devices could have further features and capabilities and perform functions in addition to those that are expressly described and claimed. Such variations are also within the scope of the present disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A device to weigh objects of a uniform nature having at least a first weighing module and a second weighing module, each weighing module comprising:
   a parallel-guiding mechanism;
   a load receiver; and
   a weighing cell connected to said load receiver through a force-transmitting rod, said weighing cell being arranged in a design space whose dimensions in a plane that extends orthogonal to a direction of a load are delimited by design spaces of neighboring weighing cells, wherein the parallel-guiding mechanism comprises at least one movable parallelogram leg connected to the force-transmitting rod of the associated weighing module, at least one upper parallel-guiding member, at least one lower parallel-guiding member and at least one stationary portion; and wherein the at least one stationary portion of the first weighing module is arranged within a design space of the weighing cell of the second weighing module.

2. The device according to claim 1, wherein between the first weighing module and the second weighing module there is at least one third weighing module arranged, wherein the parallel-guiding mechanism of the first weighing module passes through a design space of the third weighing module.

3. The device according to claim 1, wherein the weighing modules are rigidly connected either directly to each other or indirectly through a receiving structure.

4. The device according to claim 1, wherein each of the connecting areas of the parallel-guiding mechanism which are formed between the at least one movable parallelogram leg, the parallel-guiding members, and the at least one stationary portion has at least one thin flexure joint.

5. The device according to claim 1, wherein the at least one upper parallel-guiding member and the at least one lower parallel-guiding member of a parallel-guiding mechanism are arranged parallel to each other in three dimensions.

6. The device according to claim 1, wherein a pair of upper parallel-guiding members and a pair of lower parallel-guiding members of a parallel-guiding mechanism are each arranged in the shape of a V, converging towards the at least one movable parallelogram leg.

7. The device according to claim 1, wherein each of at least two connecting areas between the at least one upper parallel-guiding member and the at least one stationary portion or between the at least one lower parallel-guiding member and the at least one stationary portion of a parallel-guiding mechanism is equipped with an adjustment device to adjust the weighing module to be free of eccentric loading errors.

8. The device according to claim 1, wherein each parallel-guiding mechanism includes a plurality of individual components that are connected to each other.

9. The device according to claim 4, wherein each parallel-guiding mechanism is formed out of a material block, wherein the at least one movable parallelogram leg, the parallel-guiding members, the at least one stationary portion and the thin flexure joints are integral portions of the material block.

10. The device according to claim 1, wherein the upper parallel-guiding members of a parallel-guiding mechanism are connected to a portion of the force-transmitting rod that lies between the respective load receiver and the respective weighing cell, and the lower parallel-guiding members of said parallel-guiding mechanism are connected to a portion of the force-transmitting rod that extends beyond the weighing cell in the direction of the load and lies on the side of said weighing cell that faces away from the load receiver.

11. The device according to claim 2, wherein some or all of the upper parallel-guiding members are joined together in one or more plates forming an upper compound of stationary end portions for the upper parallel-guiding members, and some or all of the lower parallel-guiding members are joined together in one or more plates forming a lower compound of stationary end portions for the lower parallel-guiding members, wherein the upper compound of stationary end portions and the lower compound of stationary end portions are arranged between the load receivers and the weighing cells, said upper compound and lower compound being rigidly connected and spaced apart from each other through spacer blocks.

12. The device according to claim 10, wherein some or all of the upper parallel-guiding members are joined together in one or more plates forming an upper compound of stationary end portions for the upper parallel-guiding members, and some or all of the lower parallel-guiding members are joined together in one or more plates forming a lower compound of stationary end portions for the lower parallel-guiding members, wherein the upper compound is connected to a portion of the force-transmitting rods that lies between the respective load receivers and the respective weighing cells, and the lower compound which lies on the side of said weighing cells that faces away from the load receivers is connected to a portion of the force-transmitting rods that extends beyond the weighing cells in the direction of the load.

13. The device according to claim 11, wherein at least one of the parallel-guiding mechanism, the upper parallel-guiding members and the lower parallel-guiding members is an integral part of a material block, wherein at least one of each parallel-guiding mechanism, each upper parallel-guiding member with appurtenant thin flexure joints and upper movable end portion and each lower parallel-guiding member with appurtenant thin flexure joints and lower movable end portion is formed by material-free spaces passing through the plate at a right angle to its main plane or cutting orthogonally through the plate.

14. The device according to claim 1, wherein the weighing modules are arranged above each other in at least one upper plane and at least one lower plane wherein the respective weighing modules in each plane form a linear or two-dimensional array.

15. The device according to claim 14, wherein the weighing modules of the upper plane are arranged with a lateral offset relative to the weighing modules of the lower plane.

16. The device according to claim 2, wherein the weighing modules are rigidly connected either directly to each other or indirectly through a receiving structure.

17. The device according to claim 16, wherein each of the connecting areas of the parallel-guiding mechanism which are formed between the at least one movable parallelogram leg, the parallel-guiding members, and the at least one stationary portion has at least one thin flexure joint.

18. The device according to claim 17, wherein the at least one upper parallel-guiding member and the at least one lower parallel-guiding member of a parallel-guiding mechanism are arranged parallel to each other in three dimensions.

19. The device according to claim 18, wherein each of at least two connecting areas between the at least one upper parallel-guiding member and the at least one stationary portion or between the at least one lower parallel-guiding member and the at least one stationary portion of a parallel-guiding mechanism is equipped with an adjustment device to adjust the weighing module to be free of eccentric loading errors.

20. The device according to claim 19, wherein the upper parallel-guiding members of a parallel-guiding mechanism are connected to a portion of the force-transmitting rod that lies between the respective load receiver and the respective weighing cell, and the lower parallel-guiding members of said parallel-guiding mechanism are connected to a portion of the force-transmitting rod that extends beyond the weighing cell in the direction of the load and lies on the side of said weighing cell that faces away from the load receiver.

* * * * *